United States Patent Office 2,972,111
Patented Feb. 14, 1961

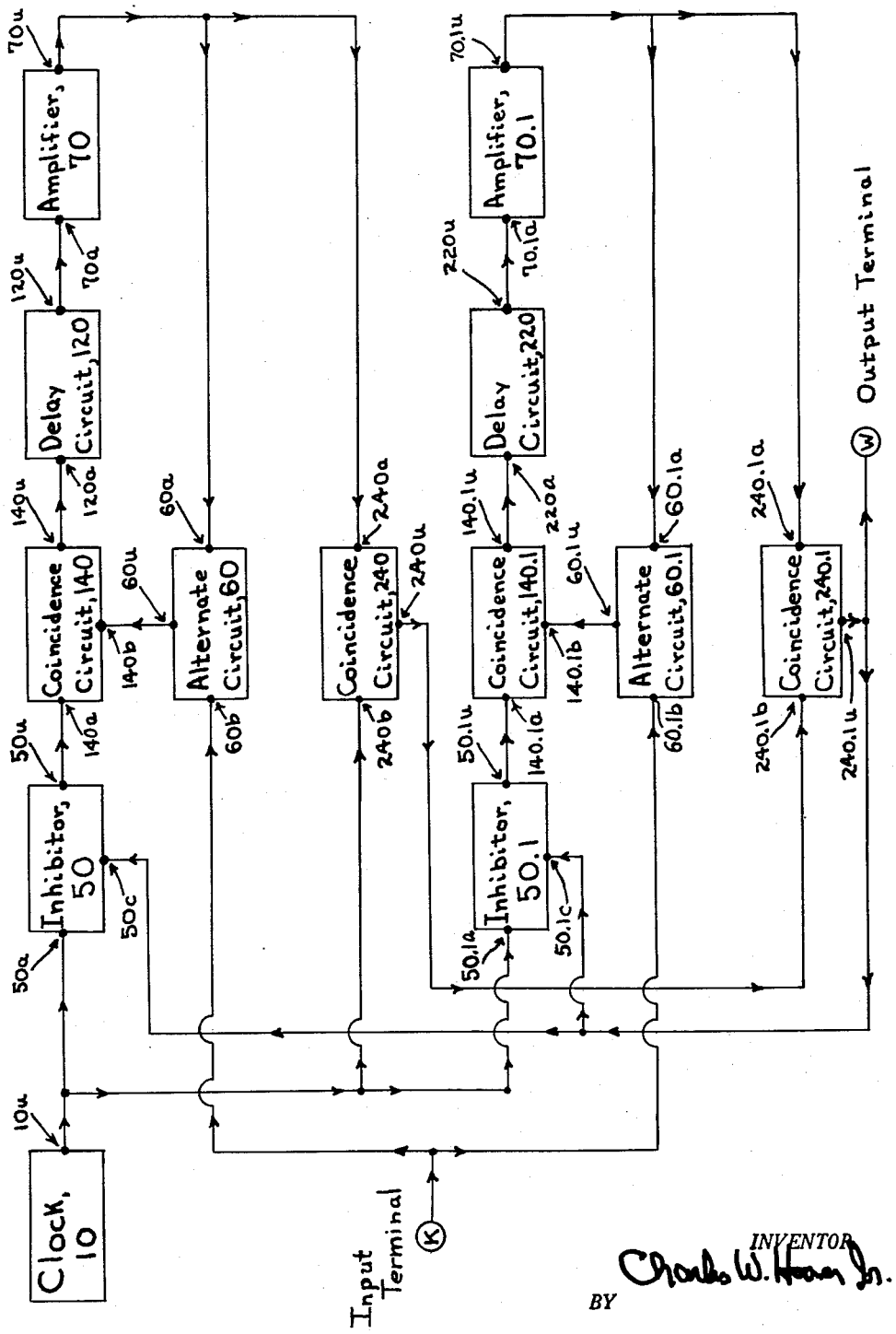

2,972,111

CLOCK-OPERATED DELAY CIRCUIT

Charles W. Hoover, Jr., 135 Butler Parkway, Summit, N.J.

Filed Aug. 13, 1958, Ser. No. 754,852

3 Claims. (Cl. 328—56)

This invention relates to a clock-operated delay circuit. The purpose of the invention is to provide a relatively simple circuit for the generation of an accurate time base of relatively long duration.

In my U.S. Patent No. 2,904,679, I have described new scaler circuitry for counting pulses such, for example, as may result from the detection of nuclear phenomena. Nuclear phenomena are often produced at a great rate. Thus it is not only difficult to count accurately the pulses representing the individual phenomena, but also difficult to determine accurately the rate at which these pulses are being produced. While in the aforesaid patent I described means for accurate counting of such pulses, in the present application I describe means for providing an accurate time base which can be readily synchronized with the counter to control the duration of its count, thus making possible an accurate measure of the rate of production of such pulses.

Ordinary delay circuits now in use do not provide sufficient delay without distortion to be used directly to define accurately a period of time long compared to the pulse length. Existing means for combining such delay circuits either produce inaccurate pulse shapes or require a great deal of circuitry, as is the case when cascaded counter stages are used to count clock pulses to establish a long delay. Furthermore existing delays are not adapted to be accurately synchronized with a clock operated counter. I have overcome these shortcomings by providing a relatively simple circuit which is capable of generating an accurate time base of relatively long duration which may be exactly synchronized with a clock-operated counter to control accurately the duration of counting by the counter.

This is accomplished in accordance with may invention by the provision of two clock-operated bi-stable elements both of which are started by a clock-synchronized signal and each of which is provided with a stopper and a delay element. Both the delay elements have periods which are integral multiples of the period of the clock and which are integral multiples of the period of the clock and their periods differ from each other by the period of the clock or an integral multiple thereof. A coincidence circuit is provided which has its inputs connected to the outputs of the two delay elements and its output connected to the stoppers and to an output terminal. For maximum overall delay with a minimum of circuitry the number of units of delay of one of said delay elements should be relatively prime (i.e. no common divisor greater than one) to the number of units of delay of the other delay element.

In describing my invention in more detail, I shall refer to the accompanying drawing in which The figure is a block diagram of a clock-operated delay circuit for generating a time base substantially longer than the period of the clock.

These are shown in the figure, two clock-operated bi-stable elements. The clock 10 is used for both. In the first bi-stable element clock 10 is connected to the input 120a of the delay circuit 120 through a coincidence circuit 140. The output 120u of the delay circuit 120 is connected back through amplifier 70 to the coincidence circuit 140. The second bi-stable element is formed of parts 10, 70.1, 220, and 140.1 which are connected in the same way as parts 10, 70, 120 and 140.

The two sets of elements which have just been described are identical except for their delay elements. Delay element 120 has a different period than delay element 220. Both delay elements have periods which are integral multiples of the period of the clock 10 and they differ from each other by the period of the clock or an integral multiple thereof. For convenience of description the clock is said to have a period T and the periods of the delay elements 120 and 220 are said to be $mT$ and $nT$ respectively where $m$ and $n$ are integers.

The two sets of parts thus far described each form a bi-stable element, that is, an element which is stable in either one of two states. In the inactive state of the first bi-stable element for example, the clock pulses arriving at the input terminal 140a of the coincidence circuit 140 produce no pulses at the output 140u of this circuit as no pulse is applied to its terminal 140b which is the other input. As a result, no pulses are passed through the delay circuit 120. In the active state of the bi-stable element every $m$th clock pulse passes through the delay circuit 120. Each delayed pulse reaching the input 140b of the coincidence circuit 140 from the output 120u of the delay circuit 120 is coincident with the next $m$th clock pulse arriving at the input 140a of the coincidence circuit 140. Consequently another pulse appears at the output 140u of the coincidence circuit 140, passes through the delay circuit 120, and returns to the input 140b of the coincidence circuit 140 coincidently with the arrival of the next $m$th clock pulse at the input 140a. This keeps the coincidence circuit 140 conductive at the time of each $m$th clock pulse producing a stable active state. The same may be said of the sseconnd bi-stable element except that in this case the active state results from the selection of the $n$th clock pulse.

Each of these bi-stable elements is provided with switching elements including a starting element for shifting it from the inactive state to the active state and a stopping element for shifting it from the active state to the inactive state.

The starting element of the first bi-stable element is the alternate circuit 60 which is inserted in the path from the delay circuit 120 between the amplifier 70 and the coincidence circuit 140. One of the input terminals 60a of the alternate circuit 60 is connected through amplifier 70 to the output 120u of the delay circuit 120, while the other input terminal 60b of the alternate circuit, which is connected to the starting signal input terminal K of the overall circuit, is available for applying a starting pulse to the input 140b of the coincide circuit 140. The starting element 60.1 of the second bi-stable element is constructed and connected to its bi-stable element and to the input terminal K in the same way.

A single pulse coincident with one of the clock pulses is sufficient to switch the bi-stable element from its inactive to its active state. The starting pulse in the first bi-stable element, for example, is brought to the input 140b of the coincidence circuit 140 by applying it to the input 60b of the alternate circuit 60. Thus the starting pulse and a coincident clock pulse reach the terminals 140a and 140b of the coincidence circuit 140 producing a pulse at the output 140u of this coincidence circuit which passes through the delay circuit 120 and back to the coincidence circuit 140. This places the bi-stable element in its active condition in which every $m$th clock pulse passes through the delay circuit 120. It is important that no other pulse is applied to the input 60b of the alternate circuit 60 when the bi-stable element is in the active state or the period of the total circuit may be changed as will become apparent from the description of the operation of the total circuit. The operation of the starting element 60.1 in the second bi-stable element is the same except that it is the $n$th clock pulses which circulate.

The stopping element for the first bi-stable element consists of an inhibitor 50 in the connection between the clock 10 and the delay circuit 120. The stopping element for the second-bi-stable element consists of inhibitor 50.1 in the connection between the clock 10 and the delay circuit 220.

A signal pulse coincident with a clock pulse is sufficient to switch the bi-stable element from its active state to its inactive state. In the first bi-stable element the stopping pulse is applied to the actuating terminal $50c$ of the inhibitor 50, thus preventing the clock pulse which is coincident with the stopping pulse from reaching the input terminal $120a$ of the delay circuit 120. There is, therefore, no delayed pulse at the input $140b$ of the coincidence circuit 140 to cooperated with the next $m$th clock pulse. Consequently no further clock pulses pass through the delay circuit 120 and the bi-stable element remains in its inactive state. The operation of the stopping element 50.1 in the second bi-stable element is the same.

Coincidence circuit 240 has one input terminal $240a$ connected through amplifier 70 to the output terminal $120u$ of delay element 120 and its second input $240b$ connected to the clock output $10u$.

Coincidence circuit 240.1 has one input terminal $240.1a$ connected through amplifier 70.1 to the output terminal $220u$ of the delay element 220 and its second input $240.1b$ connected to the output terminal $240u$ of coincidence circuit 240. Actually coincidence circuit 240 is not essential in every case because its purpose is to reshape and resynchronize the pulses from the delay element 120 with the clock pulses. This may not always be necessary. When circuit 240 is not used the input $240.1b$ is connected through amplifier 70 to the output terminal $120u$ of the delay element 120. The output $240.1u$ of coincidence circuit 240.1 is connected to the actuating terminals $50c$ and $50.1c$ of the inhibitors 50 and 50.1.

In operation a single signal pulse from a source which produces pulses which are coincident with clock pulses (and which may at the same time be used to start a counter) is applied to terminals $60b$ and $60.1b$ of the alternate circuits 60 and 60.1. As indicated above application of this pulse switches their respective bi-stable elements to the active state in which delay element 120 will produce a pulse every $m$T periods of the clock and where delay element 220 will produce a pulse every $n$T periods of the clock. Since these two outputs are connected only to their respective alternate circuits and to the coincidence circuit 240.1 pulses will continue to circulate in each bi-stable element until there is a coincidence of their outputs at input terminals $240.1a$ and $240.1b$ of coincidence circuit 240.1. If $m$ and $n$ are relatively prime to each other, that is they have no common divisor greater than one, the coincidence will occur at time $nm$T. If $m$ and $n$ are not relatively prime the coincidence in coincidence circuit 240.1 will occur at time $nm$T divided by the highest common divisor of $m$ and $n$. When this coincidence occurs there is an output signal at terminal $240.1u$ of coincidence circuit 240.1. This signal is transmitted to inhibitors 50 and 50.1, which then place the bi-stable elements in inactive state again, and to an output terminal where it may be used to stop a counter for example.

It will be apparent from comparing Fig. 1 of this application with Fig. 2 of my U.S. Patent No. 2,904,679 that all of the elements of two clock-operated scale-of-two circuits are shown in Fig. 1 of this application, although with different connections explained above. The clock 10, the inhibitors 50 and 50.1 the alternate circuits 60 and 60.1 the amplifiers 70 and 70.1 and the coincidence circuits 140 and 140.1, 240 and 240.1 which are shown in Fig. 1 of this application are identical with the elements of the same name and number (considering only the part of the number before the decimal point) shown in Fig. 2 of my U.S. Patent No. 2,904,679.

Delay elements 120 and 220 shown in Fig. 1 of this application differ from delay elements 20 shown in Fig. 2 of my U.S. Patent No. 2,904,679 in the manner described above, but both are preferably artificial lines as in the case of delay element 20.

Since the longer delays involve considerable attenuation it is especially important in such cases that amplification be provided somewhere in the loop of the bi-stable element, i.e. the loops formed by elements 140, 120 and 60 and 140.1, 220 and 60.1. Applicant's preferred embodiment is found in elements 70 and 70.1 and their locations in their loops.

What I claim is:

1. A clock-operated delay circuit comprising a clock producing pulses at regular time intervals, an input terminal for receiving a starting pulse which is coincident with a clock pulse, a first bi-stable element containing a delay element whose period of delay is an integral multiple of the clock period, a second bi-stable element containing a delay element whose period of delay is an integral multiple of the clock period and differs from the period of delay of the delay element of the first bi-stable element by an integral multiple of the clock period, a stopper for each bi-stable element connected between the bi-stable element and the clock, a starter for each bi-stable element connected between the bi-stable element and the input terminal, and a coincidence circuit having one input connected to the delay element of the first bi-stable element and a second input connected to the delay element of the second bi-stable element, and its output connected to the stoppers and to an output terminal.

2. A clock-operated delay circuit including a clock producing pulses at regular time intervals, an input terminal for receiving a starting pulse coincident with a clock pulse, a first bi-stable element including a delay element, and a coincidence circuit having its output connected to the input of the delay element, an alternate circuit for said first bi-stable element having its first input and its output connected between the output of the delay element and the second input of the coincidence circuit and its second input connected to the input terminal, an inhibitor for said first bi-stable element having its input connected to the clock and its output connected to the first input of the coincidence circuit of said first bi-stable element, a second bi-stable element including a delay element the number of whose units of delay is relatively prime to the number of units of delay of the delay element of the first bi-stable element and a coincidence circuit having its output connected to the input of the delay element, an alternate circuit for said second bi-stable element having its first input and its output connected between the output of the delay element and the second input of the coincidence circuit and its second input connected to the input terminal, an inhibitor for said second bi-stable element having its input connected to the clock and its output connected to the first input of the coincidence circuit of said second bi-stable element, and a final coincidence circuit having one input connected to the output of the delay element of the first bi-stable element and a second input connected to the output of the delay element of the second bi-stable element and its output connected to the actuating terminals of the inhibitors and to an output terminal.

3. The clock-operated delay circuit of claim 2 in which the connection from the output of the delay element of the first bi-stable element to the first input of the final coincidence circuit is replaced by an intermediate coincidence circuit which has its first input and its output connected between the output of the delay element of the first bi-stable element and the first input of the final coincidence circuit and its second input connected to the clock.

References Cited in the file of this patent

UNITED STATES PATENTS

| | | |
|---|---|---|
| 2,649,505 | Ransom et al. | Aug. 18, 1953 |
| 2,844,790 | Thompson et al. | July 22, 1958 |